May 10, 1966  L. B. STEIN, JR  3,251,014
ELECTRICAL COUPLING DEVICE
Filed Jan. 16, 1964

INVENTOR.
L. B. STEIN, JR.
BY
Moses, McGlew and Toren
ATTORNEYS

United States Patent Office 3,251,014
Patented May 10, 1966

3,251,014
ELECTRICAL COUPLING DEVICE
Laurence B. Stein, Jr., Hingham, Mass., assignor to Sigma Instruments, Inc., a corporation of Massachusetts
Filed Jan. 16, 1964, Ser. No. 338,096
6 Claims. (Cl. 336—90)

This application is a continuation-in-part of my application, Serial No. 301,516, filed August 12, 1963, which is a continuation of my application, Serial No. 789,311, filed January 27, 1959, and now abandoned.

Presently known devices for indicating or sensing voltages or currents of conductors of power lines, for such purposes as metering or control, are relatively complex, difficult to connect with the conductors of the power line and, often, cannot be connected with the power line conductors unless time-consuming safety procedures and safety devices are employed.

The principal object of the invention is to provide an inductive coupling or pick-up assembly capable of sensing the phase and magnitude of the current through the transmission line without making any electrical connections to the line; the pick-up assembly in the preferred form illustrated being similar to the ordinary line supporting insulator, and used for supporting a conductor of a high voltage transmission line.

The above and other objects and advantages of the invention will be fully understood from the following description and the drawings, in which.

Figure 1:
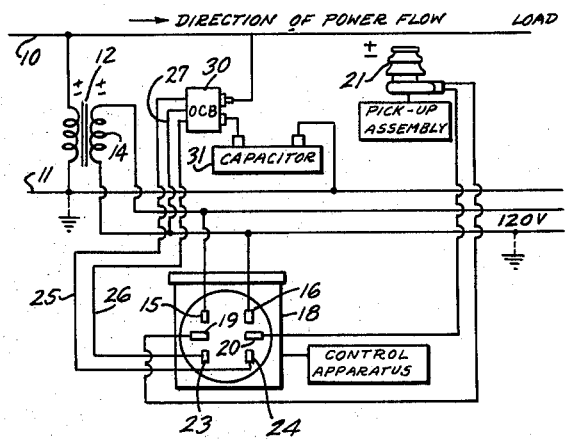
FIG. 1 is a schematic diagram of one embodiment of the invention, showing use of the subject coupling device in a system for power factor correction.
Figure 2:
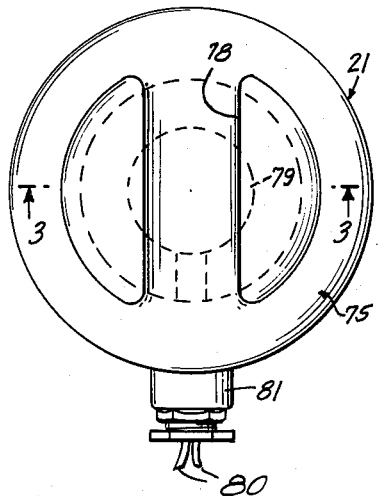
FIG. 2 is a top plan view of the pick-up assembly.

Referring particularly to FIG. 1, there is shown a circuit which may be one phase of a three-phase high voltage alternating current power distribution line 10, 11 having a distribution transformer 12 connected thereacross. The secondary winding 14 of the transformer may provide a 120 volt output and be connected to terminals 15, 16 of control apparatus 18 which is described in detail in patent application Serial No. 112,390, now Patent No. 3,091,731. The apparatus 18 also has terminals 19, 20 connected to a pick-up assembly 21 which is positioned close to one of the conductors of transmission line 10, 11 and may also assist in supporting the line. The pick-up assembly 21 includes a coupling device, such as a coil, coupled to line 10 for inductively picking up a voltage in response to the current through the line, without the necessity of breaking into the line or making any electrical connections thereto. The output terminals 23 and 24 of apparatus 18, and a neutral which may be obtained from terminal 16, are connected by conductors 25, 26 and 27 to a device 30 which may be an oil circuit breaker for connecting and disconnecting a fixed capacitor 31 from the transmission line 10, 11. The apparatus 18 compares the voltage picked up by the secondary winding 14, which voltage is representative of the voltage across transmission line 10, 11 and of substantially constant phase relative to the transmission line voltage, with an electrical quantity supplied by the pick-up assembly 21, which corresponds in magnitude and phase angle to the current through the transmission line. When the electrical quantities supplied to apparatus 18 by the secondary winding 14 and pick-up assembly 21 indicate that the load connected to the transmission line is drawing a predetermined high reactive power, the circuit breaker 30 is operated to connect the capacitor 31 across the line. The circuit breaker 30 is operated to disconnect capacitor 31 from the transmission line when the reactive power traversing the transmission line reaches another predetermined level.

Referring to FIGS. 2, 3, 4 and 5, the pick-up assembly 21 includes an insulator 75 which is of generally cylindrical form, is cup-shaped, and may be formed of porcelain or any other suitable dielectric material. The insulator may be provided with the usual annular lips or skirts 76 and its closed end 77 has an external diametrical groove 78 to receive and support a line conductor. Within the insulator, adjacent end wall 77, a pick-up coil 79 is mounted with its axis perpendicular to the direction of groove 78. A pair of insulated leads 80 extend from the coil through a bushing 81 formed in a base 82 closing the open end of insulator 75. Base 82 is formed preferably of a metal casting fastened to the insualtor by means of a suitable cement 83 or other compound. The entire cavity of insulator 75 is preferably filled with insulating compound 85. As is clearly shown, the insulator 75 is of the usual type used for carrying high voltage transmission lines and it is formed with a recess for reception of the coil 79. The pick-up assembly may be mounted so that the line 10 lies in supported relation in the groove 78, whereby the current through the line induces a voltage in adjacent coil 79 which has a given magnitude and phase relation relative to the line current. The important advantage of the pick-up assembly is that it provides a coupling to the transmission line, without electrical connection to or enclosure of the line, whereas a usual current transformer would, for example, require the primary winding to be connected in series in the line, and the structure would incorporate both a primary and secondary, with one winding surrounding the other. The present device, however, does not incorporate a primary winding within the structure but utilizes the adjacent and uninterrupted external line as the primary, while providing only a secondary coupling coil which is maintained physically close to but separate and spaced from the line. Preferably, the coil is provided with the usual axial core 86. In the present construction, no part of the structure, not even any part of the iron core, surrounds the line conductor.

By forming the insulator containing the pick-up coil like an ordinary line supporting insulator, it is possible to install the device of the present invention as a permanent line support by using it to replace one of the regular line supporting insulators. The device thus performs the function of helping to carry the line in addition to providing the current pick-up.

It is sometimes desirable to impregntae the pick-up coil and its core with a resinous or plastic material, preferable an epoxy type of plastic. This impregnation is preferably done under a vacuum so that the plastic will reach every part of the structure, removing all air and water from the coil and back-filling any interstices with the epoxy material. This prevents possible absorption of water and consequent danger of electrolytic corrosion.

Alternatively the coil may be hermetically sealed in a chamber in dry gas. It is also desirable to cover the coil and its core with a shield of non-magnetic metal such as non-magnetic stainless steel, brass or aluminum. Such a shield is shown in the form of a cup 90 into which the coil is fitted. The cup is also connected electrically with one of the coil leads, as indicated at 92. The cup thus forms an electrostatic shield preventing any substantial electric field in the vicinity of the coil. This aids in preventing possible corrosion, since no current can flow to and from the coil except on the coil leads. The cup also acts to reduce any tendency to form corona at the coil surface. The cup being a non-magnetic metal does not interfere with the useful magnetically produced induced voltage in the coil.

Figure 4:
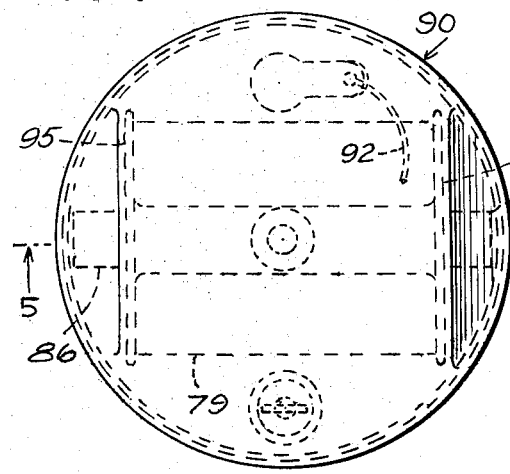
FIG. 4 is a side view on an enlarged scale of the pick-up coil enclosed in its metal shield, shown in vertical section.
Figure 3:
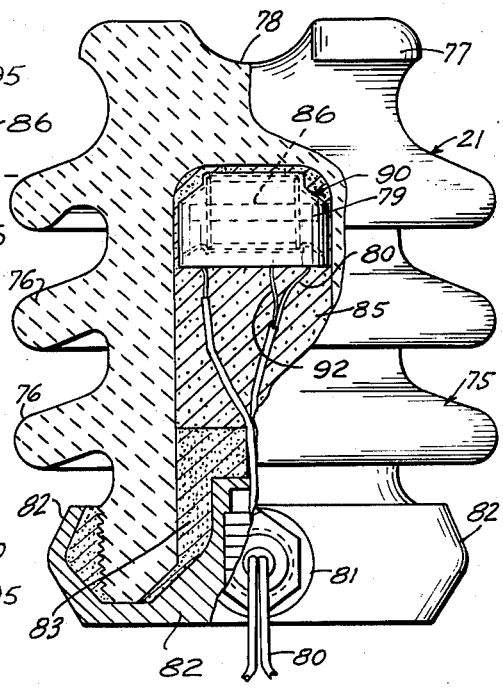
FIG. 3 is a side elevation, partly in vertical section, of the pick-up assembly.
Figure 5:
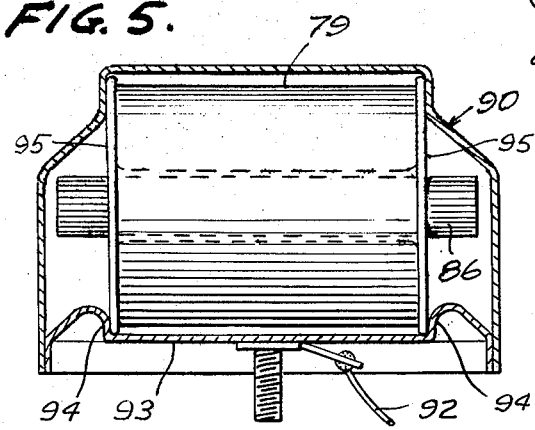
FIG. 5 is a sectional view taken on line 5—5 of the coil shown in FIG. 4.

In the construction shown in FIGS. 4 and 5, the cup 90 is shown as provided with a cover 93 sealed to the cup. The cover is shown as formed with wall portions 94 engaging the heads 95 of the coil bobbing. The cup 90 and its cover 93 constitute a sealed chamber which may contain a dry gas instead of an epoxy filling. This provides adequate protection of the coil against moisture and corrosion.

It will be understood that the insulator shown is provided with a shallow groove 78 for reception of the transmission line, which groove constitutes a means to enable orientation of the insulator so that the coil is correctly positioned angularly with respect to the axis of the main line conductor. It will be understood, however that a groove is not essential for this purpose and the insulator may be given some other formation which will enable the coil direction to be determined, or this may be done by a marking of some sort or even by the location of the nipple through which the wires extend into the insulator.

While a specific embodiment of the invention has been shown and described in detail to illustrate the application of the inventive principles, it will be understood that this invention may be embodied otherwise without departing from such principles.

What is claimed is:

1. A coupling device for obtaining a voltage from a high voltage power line current conductor, and serving as a permanent insulating support for the conductor, comprising a high voltage hollow tubular insulator having one open end and one closed end with a single cavity defined along the length of the interior thereof, said closed end having an external formation for receiving and supporting said current conductor on said insulator, and enabling said insulator to be located in predetermined angular orientation with respect to the longitudinal direction of said conductor, a measuring coil mounted within the insulator adjacent the enclosed end with the axis of the coil in predetermined angular orientation with respect to the direction of the external formation of the closed end of the insulator, and with the coil spaced inwardly from a conductor supported on said formation, a cap covering the open end of said insulator, a pair of output leads extending from said coil through and insulated from said cap, and means sealing said cap on said insulator.

2. A current transformer device, for coupling to a conductor of a power line and serving as a permanent insulating support for the conductor, comprising a tubular ceramic insulator externally similar to a high voltage line-supporting type insulator but having a single cup-shaped cavity defined along the length of the interior thereof closed at one end and open at the other end, and having external annular grooves and annular lips and an external diametrical groove in the closed end of the insulator for receiving and supporting the conductor of the power line on said insulator, a measuring coil mounted within the insulator adjacent the closed end of the insulator with the coil axis substantially perpendicular to the groove, a metallic cap covering the open end of said insulator, a pair of output leads extending from said coil through and insulated from said cap, and means sealing said cap on said insulator.

3. A pick-up assembly, for inducing voltages from a power line conductor, and serving as a permanent insulating support for the conductor, comprising: a tubular body of porcelain having external annular lips and being closed at one end and open at the opposite end and defining a single cavity along the length of the interior thereof, the closed end of the body constituting an insulating layer having an external formation by which it may be located in predetermined angular orientation and supporting relation with respect to a line conductor, a measuring coil mounted in the hollow of the body adjacent to the closed end thereof and transverse to the axis of the body; a disclosure closing the outer end of the body, and conductors leading from the ends of the coil through the closure.

4. A construction as claimed in claim 1, in which a cover of a non-magnetic but electrically conductive material encloses said coil, there being an electrical connection from the coil circuit to said electrically conducting cover.

5. A construction as claimed in claim 3, in which the coil is enclosed in a cup of non-magnetic metal which is electrically connected to one of the leads of the coil, and a filling of insulating material in the insulator also filling the metallic cup around the coil.

6. A coupling device for obtaining a voltage from a high voltage power line current conductor, and serving as a permanent insulating support for the conductor, comprising a high voltage hollow tubular insulator having one open end and one closed end with a cavity defined along the length of the interior thereof, said closed end having an external formation for receiving and supporting said current conductor on said insulator, and enabling said insulator to be located in predetermined angular orientation with respect to the longitudinal direction of said conductor, a measuring coil mounted within the insulator adjacent the closed end with the axis of the coil in predetermined angular orientation with respect to the direction of the external formation of the closed end of the insulator, a cap covering the open end of said insulator, a pair of output leads extending from said coil through and insulated from said cap, and means sealing said cap on said insulator.

References Cited by the Examiner

UNITED STATES PATENTS

| | | | |
|---|---|---|---|
| 850,258 | 4/1907 | Schmidt | 324—127 |
| 1,756,846 | 4/1930 | Blume et al. | 336—70 X |
| 1,786,412 | 12/1930 | Crisson | 336—84 X |
| 1,847,603 | 3/1932 | Fischer | 174—138 X |
| 1,862,613 | 6/1932 | Tomoda | 336—175 X |
| 1,889,552 | 11/1932 | Keinath et al. | 336—90 |
| 2,277,775 | 3/1942 | Mueller | 336—70 X |
| 2,468,125 | 4/1949 | Silver | 324—126 X |

ROBERT K. SCHAEFER, *Primary Examiner.*

JOHN F. BURNS, *Examiner.*